United States Patent [19]
Gaunt et al.

[11] Patent Number: 4,670,211
[45] Date of Patent: Jun. 2, 1987

[54] CONTROL ROD TESTING APPARATUS

[75] Inventors: Robert R. Gaunt, Windsor, Conn.; Charles M. Ashman, Granby, Mass.

[73] Assignee: Combustion Engineering, Inc., Windsor, Conn.

[21] Appl. No.: 707,266

[22] Filed: Mar. 1, 1985

[51] Int. Cl.[4] .............................................. G21C 17/00
[52] U.S. Cl. ..................................... 376/245; 376/258
[58] Field of Search ................................ 376/245, 258

[56] References Cited

U.S. PATENT DOCUMENTS

| 4,048,009 | 9/1977 | Weilbacher | 376/245 |
| 4,094,369 | 6/1978 | Blanc et al. | 376/245 |
| 4,172,760 | 10/1979 | Ballard et al. | 376/245 |

Primary Examiner—Salvatore Cangialosi
Attorney, Agent, or Firm—John H. Mulholland

[57] ABSTRACT

A control rod testing apparatus with a testing subassembly (30) floatingly secured in a guide structure (20, 48, 50). Two centering means (64, 76) center the subassembly (30) around the rod being tested. Pancake coils (72) sense the proximity of sensing fingers (82) which side against the periphery of the rod being tested for the purpose of determining the geometry of the rod.

6 Claims, 4 Drawing Figures

CONTROL ROD TESTING APPARATUS

BACKGROUND OF THE INVENTION

This invention relates to nuclear reactor control rod testing and in particular to an apparatus for testing the physical condition of finger type control rods.

The control rods which have operated within a nuclear reactor will suffer from radiation induced changes, as well as possible wear, cladding defects, swelling or ovality. In making a decision as whether to replace the rods or to continue their use, measurements must be made to evaluate potential defects.

Traditional eddy current examinations have used differential and absolute coils surrounding each rods for eddy current testing, as well as pancake proximity coils for determining the circumferential profile. It has been difficult to obtain accurate results with this traditional equipment. The control rod material property change caused by radiation is unknown, thereby introducing inaccuracies in eddy current measurement which depends on these properties. Even when a correcting calibration can be made for one portion of the control rod, errors are introduced in other portions of the control rod which have been exposed to different amounts of radiation, and which accordingly have different properties. These traditional pancake coils used to determine the profile of the rod have not been completely satisfactory.

SUMMARY OF THE INVENTION

The control rod testing apparatus has two axially spaced guide means for grossly guiding the control rod to be tested. Entrapped between these guide means is a cylindrical subassembly which is free to float a limited radial distance. Within the subassembly two centering means are located which function to center the subassembly around the control rod being tested. A plurality of proximity sensing fingers of conductive material are attached to the subassembly axially between the two centering means. Proximity coils located adjacent to each finger sense the location of the finger which in turn corresponds to the location of the control rod surface at a particular circumferential location. The apparatus being sensitive to the material and location of the fingers themselves rather than the control rod surface directly is not affected by variations in the material condition of the control rod.

DESCRIPTION OF THE PREFERRED EMBODIMENT

Figure 1:
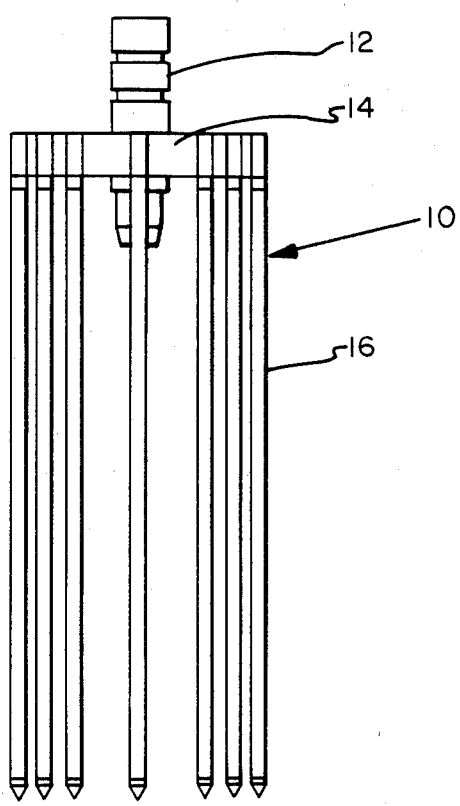
FIG. 1 illustrates the type control rod assembly being tested.

FIG. 1 illustrates a typical finger type control rod assembly with fingers of the type which are to be tested by the control rod testing apparatus. A hub 12 is attached to a spider 14 which in turn supports a plurality of elongated tubular control rods 16. These control rods contain a burnable poison such as boron carbide throughout most of their length and a poison such as Ag in Cd in the lower end of each rod.

The testing of the fingers is most conveniently carried out by lowering the control rods through the test apparatus 20 while located within the fuel storage pool. This testing apparatus may be a completely independent fixture as hereinafter illustrated, or may be a fixture secured to the top of a fuel bundle for the purpose of using the control rod guide tubes within the fuel bundle to aid in the guidance. The testing apparatus 20 will have guidance openings for all of the fingers of the control rod to be tested, but only selected portions will have a testing subassembly 30 located within them. These will be selected such that any and all of the control rods may be tested as desired by removing the control rod assembly, rotating it 90° and reinserting it into the fixture.

Figure 2:
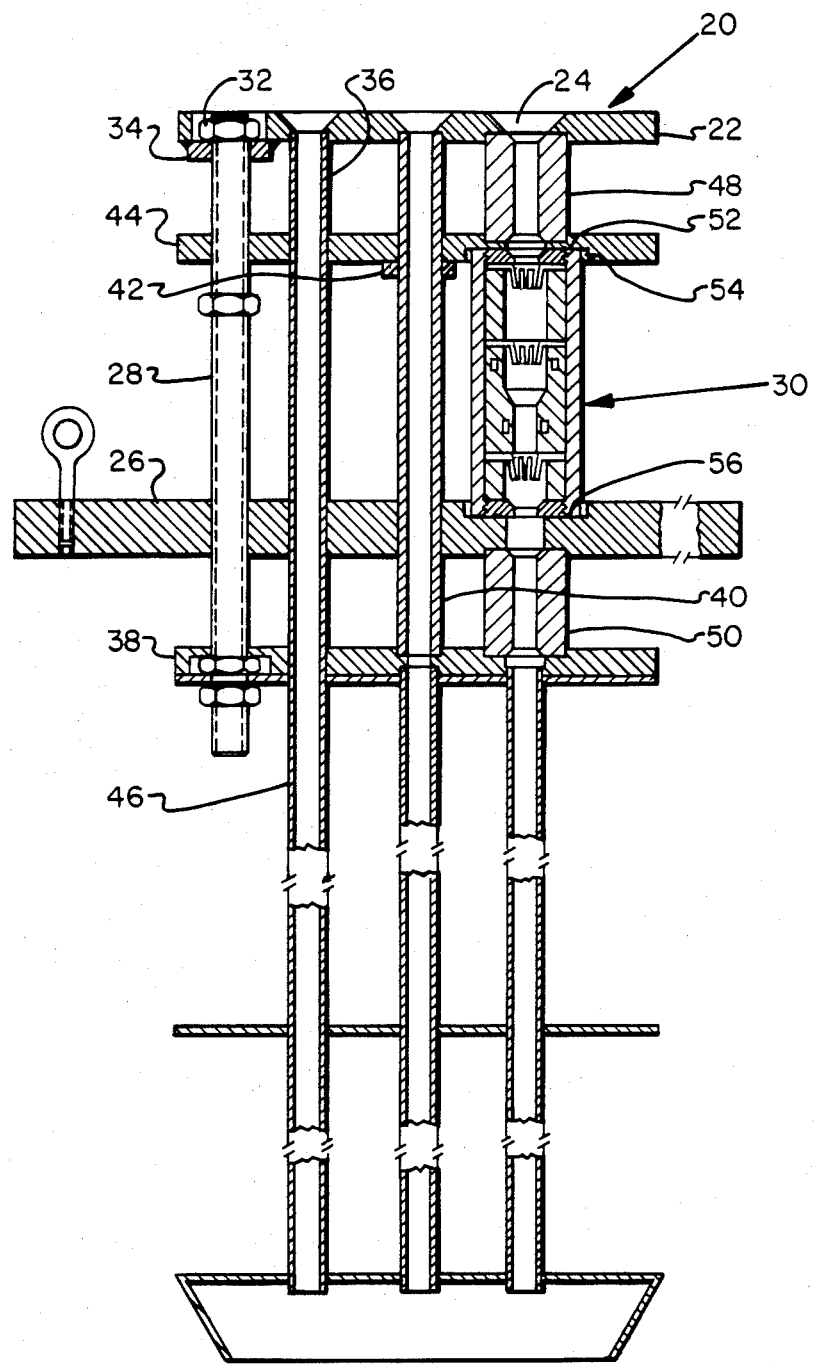
FIG. 2 is a sectional side elevation of the testing apparatus.
Figure 4:
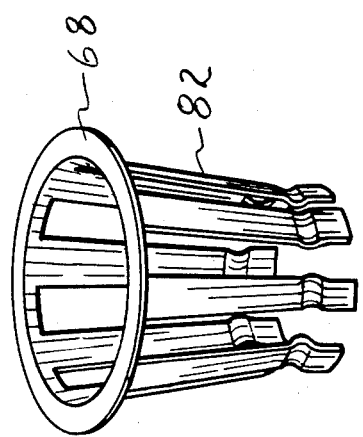
FIG. 4 illustrates the proximity finger assembly.

FIG. 2 illustrates the control rod testing apparatus with one of the subassemblies located therein. The upper plate 22 has a plurality of openings 24 located to accept the various control rods. A guide plate 26 has a plurality of studs 28 welded thereto with nut 32 located above collar 34 for the purpose of securing plate 22. A plurality of spacer pipes 36 are also welded to the guide plate 26 and arranged to abut the bottom of plate 22. This provides a predetermined spacing between the guide plate 26 and the upper plate 22.

In a somewhat similar matter, a holding plate 38 is located and secured at a lower elevation where it is spaced by tube 40. This tube 40 also includes a collar 42 a predetermined distance below upper plate 22. Spacer plate 44 rests on this collar.

Extension tubes 46 are located below the testing apparatus extending for about 10 feet to provide continuing guidance of the control rods, thereby minimizing distortion by twisting of the control rod assembly during testing. As illustrated here, these tubes are a portion of the test fixture. The test fixture could however, be fastened to the top of a fuel bundle assembly, thereby using the guide tubes within the fuel assembly for this purpose.

A first guide means in the form of a bushing 48 has a vertical cylindrical opening therethrough for grossly guiding a control rod. The inside diameter is preferably in the order 20 mils greater than the control rods to be tested. This bushing is fixably clamped between the upper plate 22 and spacer plate 44. A second guide means in the form of a bushing 50 has a vertical cylindrical opening therethrough also of an inside diameter about 20 mils greater than the control rod to be tested. This is supported between guide plate 26 and the holding plate 38 coaxial with bushing 48 and axially spaced therefrom. A substantially cylindrical subassembly 30 is clamped between spacer 44 and the guide plate 26. The fixture is spaced so that there is a clearance of about 20 mils at the upper end 52 and also a clearance of 50 mils radially around the upper circumference 54 and also the lower circumference 56. This permits the subassembly to float with respect to the guide bushings 48 and 50 in a radial direction so that the test subassembly may center itself rather accurately around the rod to be tested.

Figure 3:
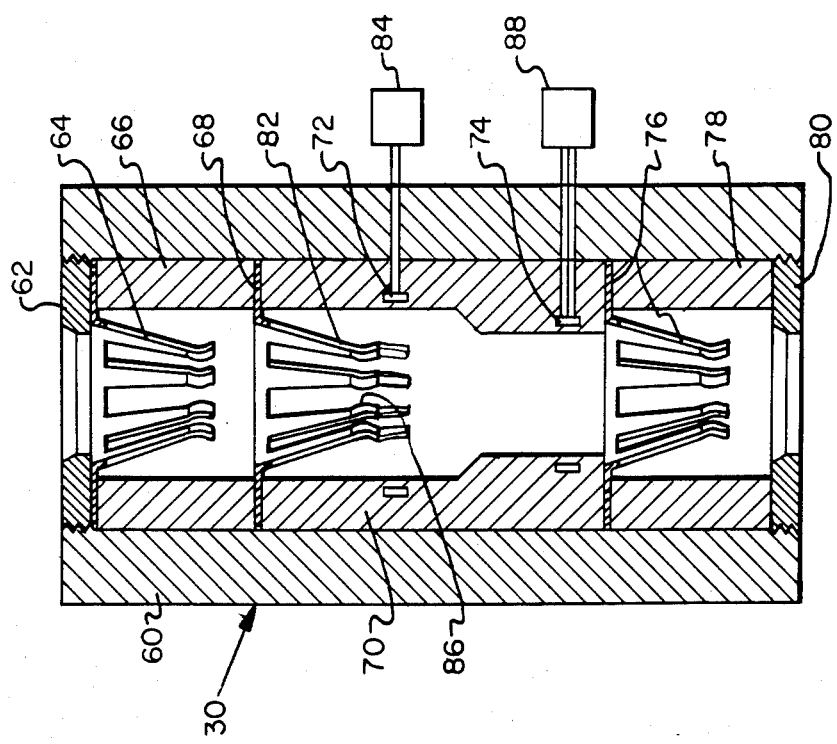
FIG. 3 is a sectional side detail of the subassembly.

FIG. 3 illustrates the subassembly in detail. A cylindrical frame 60 is accurately machined with respect to the length and outside diameter at the ends so that it fits with proper clearance between plates 44 and 26. Below a locking plate 62, there are located a plurality of centering fingers 64 which are biased inwardly. These fingers may be of a single cast piece or built up in any manner so as long as they provide a means for exerting force between the control rods passing therethrough and the subassembly, whereby the subassembly centers itself around the control rod.

Located therebelow is a spacer 66 and a plurality of proximity fingers 68. Immediately below is another cylindrical spacer 70 which includes therein a plurality of pancake coils 72 and a differential coil 74. Below this there is another set of centering fingers 76 which also function to align the subassembly with the control rod passing therethrough and a final spacer 78. A lower locking plate 80 is threadedly connected to the frame 60 with the two locking plates 80 and 62 tightened to clamp the components therebetween.

Each set of centering fingers 64 and 76 comprise of a group of eight fingers, each of which is relatively stiff for the purpose of supplying sufficient force to center the subassembly around the rod being tested. There are also eight individual fingers 82 of the proximity finger assembly 68 which rest against the control rod at 45° intervals. These are preferably less stiff than the centering fingers.

Immediately outboard of each of these fingers there is located and associated with each one a pancake coil or profilometry coil 72 which is connected to meter 84. This arrangement operates in the same manner as the traditional sensing coils for sensing proximity except that these pancake coils are now sensitive to the fingers themselves rather than the control rods passing therethrough. The fingers are made of electrically conductive material so that the coils are very sensitive to the location of the fingers and any disturbance of the reading because of any condition, other than geometry, of the control rod is minimal. With the entire subassembly being centered, the sensing fingers operate in their range of maximum sensitivity and reliability.

The contact point 86 of each finger may be selected as desired depending on the type of contact desired with the control rod. Presently recommended is 3/32 inch diameter carbide ball, silver soldered to the fingers. Whatever is selected should be of such size and shape as would not engage local defects which may occur in the control rod cladding.

Differential coil 74 is well known in the art and comprises two adjacent coils with meter 88 responding to the differential eddy current signal between the two coils. This has substantial advantage in located axial changes or conditions and is particularly advantageous for determining the start and stop of internal poison within the control rod so as to locate all measurements or defects with respect to this point. The coil also may be operated using only one coil to obtain gross measurements of the amount of cladding existing, thereby determining where indications, although this is a generally conventional test.

We claim:

1. A control rod testing apparatus comprising:
 a first guide means having a vertical cylindrical opening for grossly guiding a control rod;
 a second guide means having a vertical cylindrical opening for grossly guiding a control rod, said first and second guide means supported at axially spaced locations with the openings coaxial;
 a substantially cylindrical subassembly having a vertical cylindrical opening therethrough, said subassembly trapped coaxial with and between said first and second guide means, and said subassembly radially floating with respect to said first and second guide means;
 a first centering means for centering a control rod with respect to said subassembly, integral with said subassembly;
 a second centering means for centering a control rod with respect to said subassembly integral with said subassembly, and axially spaced from said first centering means, whereby said subassembly is centered around the control rod;
 a plurality of proximity sensing fingers of conductive material attached to said subassembly, circumferentially spaced around said subassembly, and biased radially inwardly;
 a plurality of pancake coils, each located radially outboard of a corresponding sensing finger for sensing the proximity of each finger to each pancake coil;
 a measuring means responsive to said pancake coil for interpreting electrical signals sent therefrom.

2. A testing apparatus as in claim 1:
 said first and second centering means each comprising a plurality of inwardly biased spring fingers.

3. A testing apparatus as in claim 2:
 said first and second centering means, each comprising at least eight inwardly biased spring fingers.

4. A testing apparatus as in claim 1:
 said plurality of sensing fingers comprising at least eight fingers.

5. A testing apparatus as in claim 2:
 said plurality of sensing fingers comprising at least eight fingers.

6. A testing apparatus as in claim 3:
 said plurality of sensing fingers comprising at least eight fingers.

* * * * *